Figure 4:
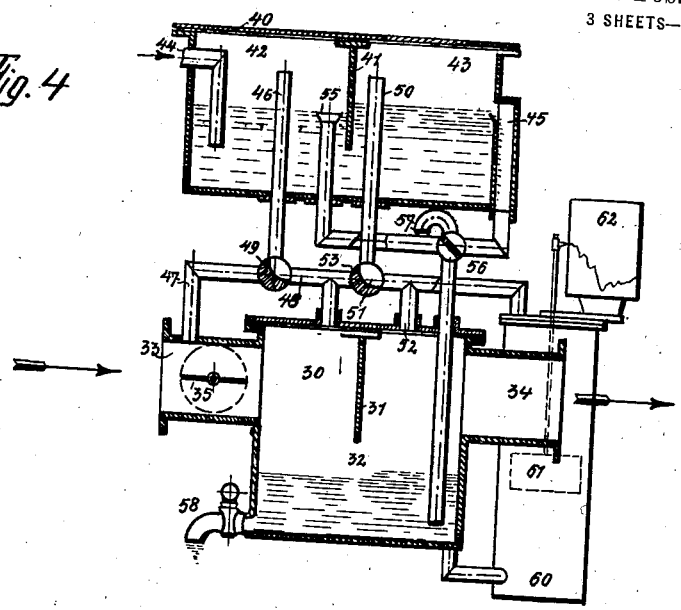

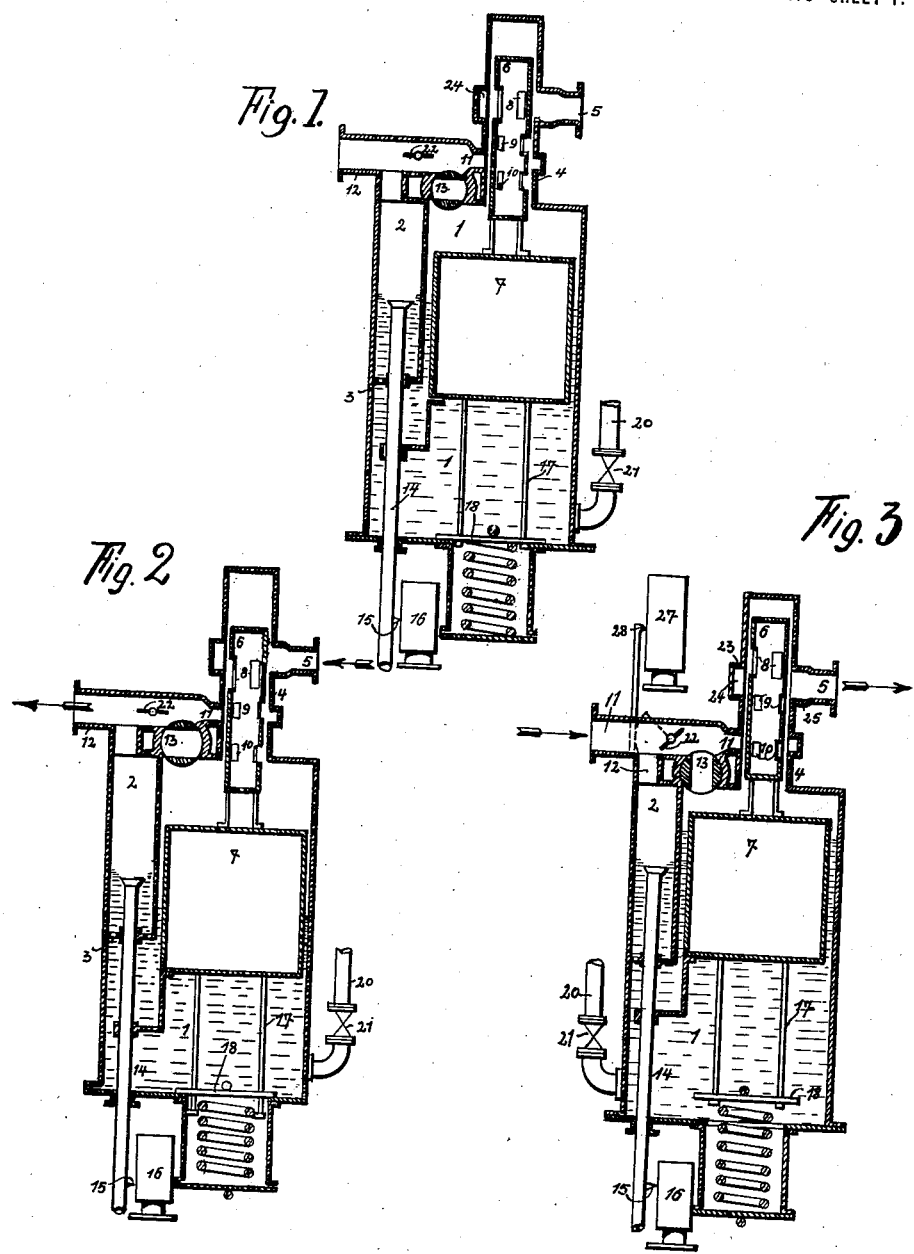
H. M. LIESE.
APPARATUS FOR CONTROLLING THE VELOCITY OF A FLUID FLOWING THROUGH A PASSAGE.
APPLICATION FILED SEPT. 17, 1913.
1,215,669. Patented Feb. 13, 1917.

H. M. LIESE.
APPARATUS FOR CONTROLLING THE VELOCITY OF A FLUID FLOWING THROUGH A PASSAGE.
APPLICATION FILED SEPT. 17, 1913.

1,215,669.

Patented Feb. 13, 1917.
3 SHEETS—SHEET 2.

Inventor,
H. M. Liese
by Foster Freeman Watson & Coit
Attorneys.

H. M. LIESE.
APPARATUS FOR CONTROLLING THE VELOCITY OF A FLUID FLOWING THROUGH A PASSAGE.
APPLICATION FILED SEPT. 17, 1913.
1,215,669.
Patented Feb. 13, 1917.
3 SHEETS—SHEET 3.
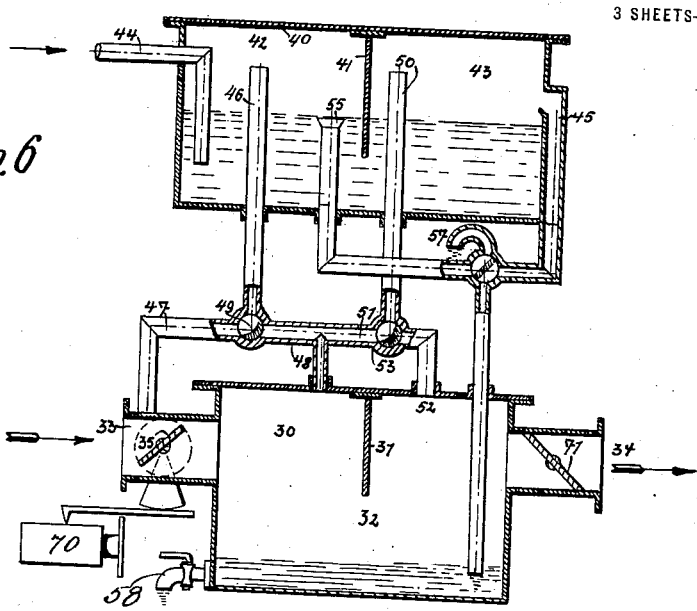
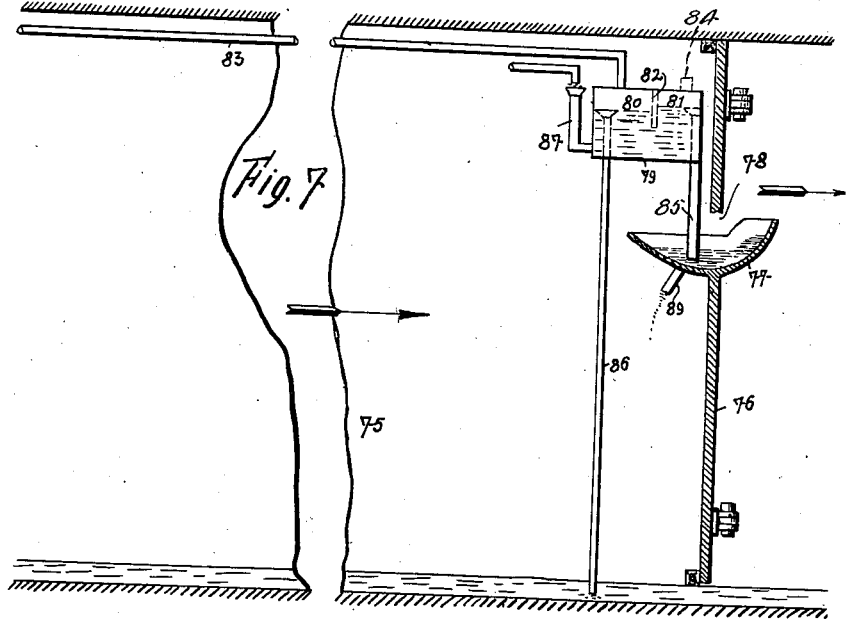

UNITED STATES PATENT OFFICE.

HENDRIK MATHŸS LIESE, OF HAMBURG, GERMANY.

APPARATUS FOR CONTROLLING THE VELOCITY OF A FLUID FLOWING THROUGH A PASSAGE.

1,215,669.

Specification of Letters Patent. Patented Feb. 13, 1917.

Application filed September 17, 1913. Serial No. 790,349.

*To all whom it may concern:*

Be it known that I, HENDRIK MATHŸS LIESE, a citizen of the Kingdom of the Netherlands, residing at Hamburg, in the free State of Hamburg, Germany, have invented certain new and useful Improvements in Apparatus for Controlling the Velocity of a Fluid Flowing Through a Passage, of which the following is a specification.

My invention relates to improvements in apparatus for controlling the velocity of a fluid flowing through a passage and more particularly in apparatus of the class in which the velocity of the fluid is controlled by conducting the same through a passage the area of which can be adjusted according to varying conditions of pressure on the inlet or outlet side of the said passage, which adjustment is effected by transmitting the differential pressure of the fluid at opposite sides of a measuring passage provided in the conduit for the fluid to a regulating device. And the object of the improvements is to provide an apparatus of this class in which the area of the throttling passage is controlled by a column of a liquid which is adapted to assume different levels under the differential pressure of the fluid at the opposite sides of the measuring passage. In the practice of the invention the said liquid can be made to regulate the throttling passage in different ways. Suitable means consist in providing in the column of liquid a float which is directly connected with a valve controlling the throttle passage or in providing a container at the lower part of the throttle passage and causing the same to be filled more or less with a liquid which is adapted to obstruct the throttle passage, the admission of the said throttling liquid being controlled by the regulating liquid.

My improved regulating apparatus may be used for various purposes. For the purpose of explaining the invention I shall describe a few examples of using the apparatus. But I wish it to be understood, that my invention is not limited to the examples nor to the constructions of the apparatus shown in the drawings. In said drawings Figures 1 to 3, are vertical sections of the apparatus in which the column of liquid acts on the throttle passage through a float, the figures showing the apparatus in different positions, Fig. 1 showing the same in the out of use position, Fig. 2 showing the same in the position in which the amount of fluid is being measured, and Fig. 3 showing the same in the position in which the amount of fluid is regulated.

Figure 5:
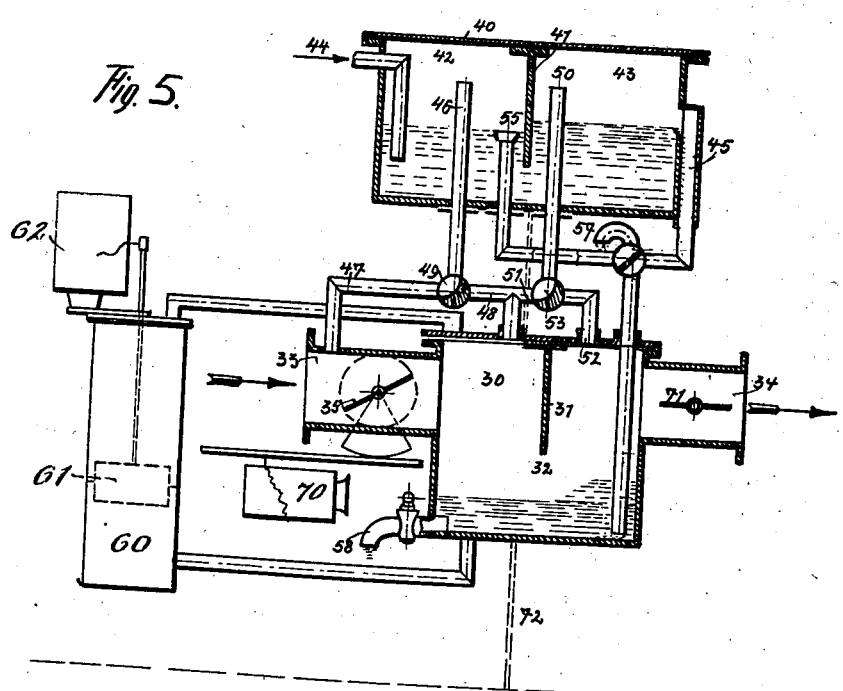

Figs. 4 to 6, are sections of a modification of the apparatus in which the throttle passage is obstructed more or less by an obstructing liquid the parts of the apparatus being shown in different positions, Fig. 4 showing the same in the position in which the fluid is being measured, Fig. 5 showing the same in the position in which the amount of the fluid is being regulated, and Fig. 6 showing the apparatus in regulating position, the flow of the fluid being temporarily stopped, and Fig. 7, is a section of a conduit for conducting fresh air to mines and provided with an apparatus similar to that shown in Figs. 4 and 5 for controlling the admission of the air to the said conduit.

Referring now to the example illustrated in Figs. 1 to 3 my improved measuring apparatus consists of a receptacle comprising two chambers 1 and 2 communicating with each other through a hole 3. The top wall of the receptacle 1, 2 is provided with a cylinder 4 formed with a tubular stud 5. Within the cylinder 4 there is a cylindrical valve 6 which is connected with a float 7 located within the chamber 1. The valve cylinder is formed with upper throttling ports 8 coöperating with the stud 5 and with two sets of lower measuring ports 9 and 10 coöperating with a tubular stud 11. The latter is adapted to be closed more or less by a valve 22 and it is connected with the chamber 2 through a passage 12 and is adapted to be thrown into communication with the chamber 1 through a valve 13. The float 7 is connected with a tube 14 which extends with its upper end into the chamber 2 and takes part in the movements of the float 7. At its lower end which opens into the atmosphere the tube 14 is provided with a pencil 15 or the like by means of which the position of the float 7 is recorded on a drum 16. At its bottom the float 7 is provided with two rods 17 having enlarged ends and extending through holes made in a cross-piece 18. The latter is secured to a spring 19 which is fixed at its opposite ends to the bottom of the receptacle 1, 2. The chamber 1 has a liquid supply through a pipe 20 provided with a valve 21. Where the apparatus is used for measuring steam this supply is not necessary.

When using the apparatus it will be filled to the level indicated in the figures with water or another suitable liquid. In the out-of-use position shown in Fig. 1 the level of the liquid is the same in both chambers 1 and 2 and the float 7 is held in a medium position by the spring 19.

When it is desired to use the apparatus for measuring the amount of an elastic fluid, the valve 13 is set in the position shown in Fig. 2 in which the stud 11 is disconnected from the chamber 1 and the fluid is admitted through the stud 5 and discharged through the stud 11. Thereby the fluid acts on the liquid in chamber 1 and forces the same downward; the float is lowered until the spring 19 ceases to act thereon and its weight and floating force are at an equilibrium, the water displaced by such movement escaping through the opening 3 and the overflow 14. The opening has the further function to deaden any shocks which might be transmitted from an engine or the like to the fluid flowing through the measuring apparatus.

In the position shown in the figure the fluid flows through the upper set of measuring ports 9 where a reduction of the pressure on the inlet and outlet sides of the ports 9 is transmitted to the liquid within the communicating chambers 1 and 2 and the differential pressure causes the liquid to assume different levels in the said chambers. When equilibrium has been reëstablished the ports 9 have been opened an amount which is proportional to the amount of fluid flowing through the apparatus, the loss of pressure and therefore the velocity of the fluid passing through the ports remaining constant. The position of the ports 9 and therefore the amount of fluid passing through the apparatus are recorded on the drum 16.

When admission of the fluid takes place through the stud 11 and discharge through the stud 5 the conditions are reversed, the level of the liquid within the chamber 1 being higher than within the chamber 2 and the fluid flowing through the ports 10. In this case the float 7 is apart from its weight under the action of the spring 19, and the liquid in chamber 1 rises to a higher level according to the increased load on the float. The opening of the ports 10 and thereby the amount of fluid flowing through the apparatus are recorded on the drum 16.

In both cases a constant supply of liquid to the chambers 1 and 2 takes place and the excess escapes through the overflow 14. In case of steam the said liquid is supplied by the condensed water, while in case of other gases the liquid is supplied through the pipe 20 and valve 21.

If it is desired to regulate the fluid in such a way, that a constant amount of fluid flows through the apparatus, I set the valve 13 in such a way as to establish communication between the stud 11 at the right hand side of the valve 22 and the chamber 1 and I partly close the valve 22 according to the desired fluid supply. Thereby the differential pressure on opposite sides of the valve 22 acts on the level of the liquid as will readily be understood from the description of Fig. 2, and the float 7 and the ports 8 are set according to the weight of the float or to the weight and the pressure of the spring, according to the direction of flow of the fluid which is admitted either through stud 11 or stud 5. When admission takes place through the stud 11 the fluid is throttled by the upper wall of the annular passage and when admission takes place through the stud 5 the fluid is throttled at the lower wall of said passage. Should in the former case the pressure at the discharge be reduced and thereby the velocity and the differential pressure of the fluid flowing past the valve 22 be increased, the level of the liquid within the chamber 2 falls while it rises in the chamber 1. Thereby the float and the cylindrical valve 6 rise, the open area of the port 8 is reduced and the resistance of the fluid within the port is increased until the normal amount of fluid flows through the apparatus.

By setting the valve 22 the amount of fluid flowing through the apparatus is varied. This can be done by hand or by automatic means. The position of the valve 22 and thereby the amount of fluid flowing through the apparatus can be recorded on a rotary drum 27 by means of a pencil 28 connected with valve 22.

In the example shown in Figs. 4 to 6 a liquid is used for obstructing the throttle passage more or less and as in the example shown in Figs. 1 to 3 the supply of the throttling liquid is controlled by a column of liquid. As shown a receptacle 30 is provided with a partition wall 31 extending downward from the top wall of the receptacle to near the bottom, so as to leave a throttle passage 32. The receptacle is provided at opposite sides of the partition 31 with inlet and outlet studs 33 and 34. One of the studs, in the example shown in the figures the stud 33, is provided with a valve 35 which is adapted to be set in different positions by hand or automatically.

Above the receptacle 30 a receptacle 40 is located which is divided by a partition 41 into two chambers 42 and 43 communicating with each other at the bottom of the receptacle. The chamber 42 has a supply of a suitable liquid through a pipe 44 and the said liquid is withdrawn from the chamber 43 through a channel 45. The chamber 42 is adapted to be thrown into communication at its upper end with the part of the stud 33 at the left of the valve 35 or with the section of the receptacle 30 at the left of the partition 31, for which purpose a pipe 46 having two branches 47 and 48 and a two-way cock 49 are provided. In a similar way the chamber 43 can be thrown into communication with either one of the sections of the receptacle 30 through a pipe 50 having two branches 51 and 52 and a two-way cock 53. The chamber 42 communicates through a pipe 55 providing an overflow and a two-way cock 56 with the receptacle 30. The two-way cock 56 is also adapted to connect the channel 45 or the overflow 55 with a discharge 57. The receptacle 30 is provided with a discharge 58 and is in communication with a receptacle 60 containing a float 61 which is adapted to record the level of the liquid within the receptacle 30 on a drum 62.

If it is desired to measure the amount of a fluid the fluid supply is connected with the stud 33, and the parts are set in the position shown in Fig. 4, that is valve 35 is entirely open and the valves 49 and 53 connect the chambers 42 and 43 respectively with the right and left sections of the receptacle 30. Thereby the pressure of the fluid at the left and right hand side of the partition 31 is transmitted to the chambers 42 and 43, so that the liquid within the said chambers is at the levels shown in Fig. 4. From the chamber 42 part of the liquid flows through pipe 55 and two-way cock 56 to receptacle 30 where it partly obstructs the measuring passage 32. The excess of the liquid escapes through channel 45 and discharge 57. The level of the liquid and the amount of the fluid flowing through the apparatus are recorded on the drum 62.

If the amount and velocity of fluid flowing through the measuring passage 32 are increased, the resulting increase in the differential pressure of the fluid at opposite sides of the passage 32, is transmitted to the chambers 42 and 43, so that the level of the liquid within chamber 42 falls and the level within chamber 43 rises.

Therefore the supply of liquid through pipe 55 to receptacle 30 is stopped, the excess of the liquid within receptacle 40 being discharged through channel 45. As the discharge of liquid from receptacle 30 remains the same, the level of the liquid within receptacle 30 falls until the normal velocity and differential pressure of the fluid flowing through passage 32 are reëstablished. The said pressure is transmitted through pipes 46 and 50 to chambers 42 and 43 so that the liquid within the chambers assumes again the normal levels. Through overflow 55 so much liquid is supplied to receptacle 30 as is discharged through 58 so that the area of passage 32 remains constant until the velocity of the fluid flowing through passage 32 is again changed. The changes of the level and of the area of the passage 32 and therefore the amount of the fluid passing through the apparatus are recorded on the drum 62.

In Fig. 5 I have shown the apparatus in the positions of the parts which are used for regulating the amount of the fluid in such a way that the volume remains constant. In addition to the measuring apparatus consisting of receptacle 60, float 61 and drum 62 I have shown in this figure a drum 70 which is adapted to record the position of the valve 35 and thereby the amount of fluid flowing through the apparatus.

In the example shown in Fig. 5 the apparatus is designed for regulating the supply of air of combustion to a fireplace, such for example as the grating of a steam boiler. But I wish it to be understood, that my invention is not limited to the use of the apparatus shown in the drawings, and that I have shown the same merely because it is my opinion that the invention will be better understood by referring to a particular use of the apparatus.

If it is desired to use the apparatus for controlling the admission of air to the fire place of a steam boiler, it is equipped with a valve 71 which is closed when opening the fire door and the valve 35 is set according to the amount of the air required to complete combustion. When the valve 71 is closed no fluid flows through the apparatus and there is no differential pressure at opposite sides of the partition 31 and the liquid within chambers 42 and 43 is at the same level as is indicated in Fig. 6. The liquid escapes through overflow 55 and discharge 57 so that the receptacle 30 is empty and the passage 32 is fully open. If now the fire door is closed and valve 71 opened, a large amount of air rushes through the unobstructed passage 32, so that complete combustion of the large amount of gases which are now being developed is assisted. The pressure of the air flowing along valve 35 is reduced and the differential pressure is transmitted to chambers 42 and 43, so that the level in chamber 42 falls and the level in chamber 43 rises. The liquid flows through channel 45 and into receptacle 30 which is gradually filled to the level shown in Fig. 5, the time required for thus refilling the receptacle depending on the position of valve 35 which is adjusted to vary the size of the passage through the conduit 33 according to the time during which much gas is being developed and much air is required.

If in normal operation the pressure at the discharge from the apparatus is reduced for some reason or other the velocity and the differential pressure of the air passing through the valve 35 are increased. Therefore the water level in chamber 42 is further lowered to below the level shown in the drawing and the upper end of the overflow 55 so that more water flows from receptacle 40 into receptacle 30, through channel 45, and the area of passage 32 is reduced until normal conditions are reëstablished. If the pressure in the flues is again increased to its normal value, the velocity and differential pressure at valve 35 are again reduced, the level in chamber 42 again rises to above the level of the overflow 55 and it falls in chamber 43. Therefore the flow of liquid through overflow 55 and discharge 57 is increased and the flow through channel 45 and into receptacle 30 is reduced. Therefore the level of the liquid in receptacle 30 is reduced and the area of passage 32 increased, so that the desired amount of air passes through the apparatus.

If it is desired, to have the apparatus reversible, the overflow is constructed in such a way, as to be vertically adjustable. After setting overflow 55 with its inlet end at a higher level, it assumes the function of channel 45 and channel 45 assumes the function of overflow 55. When using the apparatus as a measuring device, cock valve 56 is set in the position shown in Fig. 5 and when using the apparatus for regulating the amount of the fluid, cock valve 56 is set in the position shown in Fig. 4.

In Fig. 7, I have shown the apparatus shown in Figs. 4 to 6 as used for regulating the ventilation of mines. As shown a conduit 75 for conducting the air is provided with a trap door 76 having a passage 78 and at the lower end a gutter 77 adapted to receive an obstructing liquid and having a discharge 89. At the side of the door a receptacle 79 is located which is divided by a partition 82 into two chambers 80 and 81 communicating with each other at the bottom of the receptacle. The chamber 80 is connected by a pipe 83 with a point several hundreds of meters in front of the door 76. Chamber 81 opens into the conduit 75 at a point near the door. The receptacle has a liquid supply 87, an overflow 86 providing a discharge for the liquid, and a channel 85 adapted to conduct the liquid into the gutter 77.

The length of the conduit from the inlet end of the pipe 83 to the door 76 corresponds to the valve 35 shown in Figs. 4 to 6. If the volume and velocity of air flowing through the conduit are increased above the normal the reduction of the pressure of the air on its way from the inlet end of pipe 83 to trap door 76 is likewise increased. Therefore the level of the liquid in chamber 80 falls and it rises in chamber 81. A smaller amount of liquid escapes from chamber 80 and through discharge 86 and a greater amount is supplied to gutter 77 through channel 85. Thereby the area of passage 78 and the volume of air flowing through the conduit are reduced until normal conditions are reëstablished.

The volume of air flowing through the conduit can be varied by changing the length of pipe 83.

The apparatus may also be used as an anemometer for measuring the velocity of the wind and other air currents for which purpose the said currents are directed for instance through the apparatus shown in Fig. 4.

I claim:

1. In an apparatus of the class described, the combination with a closed receptacle comprising two communicating chambers, and a liquid supply to and a liquid discharge from said receptacle, of a conduit for a fluid comprising at least one measuring passage, opposite sides of said measuring passage communicating each with one of said chambers, and means controlled by the levels of the liquid within said chambers to adjust the area of the measuring passage.

2. In an apparatus of the class described, the combination with a closed receptacle comprising two communicating chambers, and a liquid supply to and a liquid discharge from said receptacle, of a conduit for a fluid comprising at least one measuring passage, opposite sides of said measuring passage communicating each with one of said chambers, means controlled by the levels of the liquid within said chambers to adjust the area of the measuring passage, and means to measure the area of the measuring passage.

3. In an apparatus of the class described, the combination with a closed receptacle comprising two communicating chambers, and a liquid supply to and a liquid discharge from said receptacle, of a conduit for a fluid comprising at least one measuring passage and at least one throttling passage, opposite sides of said measuring passage communicating with one of said chambers, and means controlled by the levels of the liquid within said chambers to adjust the area of the throttling passage.

4. In an apparatus of the class described, the combination with a closed receptacle comprising two communicating chambers, and a liquid supply to and a liquid discharge from said receptacle, of a conduit for a fluid adapted to be connected with either one of its ends to the fluid supply and comprising at least one measuring passage, opposite sides of said measuring passage communicating each with one of said chambers, means controlled by the levels of the liquid within said chambers to adjust the area of the measuring passage, and means to reverse the relative position of the levels of the liquid within said chambers.

5. In an apparatus of the class described, the combination with a closed receptacle comprising two communicating chambers, and a liquid supply to and a liquid discharge from said receptacle, of a conduit for a fluid adapted to be connected with either one of its ends to the fluid supply and comprising at least one measuring passage and at least one throttling passage, opposite sides of said measuring passage communicating each with one of said chambers, means controlled by the levels of the liquid within said chambers to adjust the area of the throttling passage and means to reverse the relative position of the levels of the liquid within said chambers.

6. In an apparatus of the class described, the combination with a closed receptacle comprising two communicating chambers, and a liquid supply to and a liquid discharge from said receptacle, of a conduit for a fluid comprising at least one measuring passage and at least one throttling passage, opposite sides of said measuring passage communicating each with one of said chambers, means controlled by the levels of the liquid within said chambers to gradually adjust the area of the throttling passage, and means to temporarily interrupt the flow of the fluid.

In testimony whereof I affix my signature in presence of two witnesses.

HENDRIK MATHŸS LIESE.

Witnesses:
ERNEST H. L. MUMMENHOFF,
FRANK REINHOLD.